United States Patent [19]

Pittenger

[11] 3,831,452

[45] Aug. 27, 1974

[54] GAS SAMPLER

[75] Inventor: Harold M. Pittenger, Tulsa, Okla.

[73] Assignee: Charles Wheatley, Inc., Tulsa, Okla.

[22] Filed: Jan. 8, 1973

[21] Appl. No.: 321,661

[52] U.S. Cl. .......................... 73/421.5 R, 73/422 R
[51] Int. Cl. ............................................ G01n 1/16
[58] Field of Search.... 73/421.5 R, 421.5 A, 422 R, 73/298; 137/315, 317

[56] References Cited
UNITED STATES PATENTS
2,091,613   8/1937   Polson ................................. 73/422
3,747,411   7/1973   McDermott et al. ................ 73/422

Primary Examiner—S. Clement Swisher
Attorney, Agent, or Firm—Mildred K. Flowers

[57] ABSTRACT

An apparatus for retrieving a sample of gas in a pipe line, or the like, which may be secured to the outer periphery of the pipe line for retrieving a sample of the fluid passing through the pipe line at substantially any desired area therein. An outer tube is threadedly engaged with a threaded shank secured to the outer periphery of the pipe line and carries an inner tube which is selectively inserted into the interior of the pipe line for picking up fluid samples therefrom. The position of the open portion of the inner tube within the pipe line may be adjusted for retrieving a fluid sample from substantially any desired cross sectional area within the pipe line.

5 Claims, 3 Drawing Figures

GAS SAMPLER

BACKGROUND OF THE INVENTION

1. Field of the Invention

This invention relates to improvements in gas sampling devices and more particularly, but not by way of limitation, to a device for retrieving a fluid sample from substantially any desired area within a pipe line.

2. Description of the Prior Art

It is frequently desirable to take samples of fluids moving through pipe lines in order to test the fluids, or to otherwise ascertain desired information relating to the fluid moving therethrough. These fluid samples may be selectively taken from the pipe line and removed for chemical analysis, or the like, or otherwise tested, and of course, it is often desirable to extract samples of the fluid from various portions of the cross sectional area of the pipe line. It is usual practise to provide a plurality of longitudinally spaced internally threaded fittings or bosses on the outer periphery of the pipe line or flow line in communication with the interior thereof. A suitable valve, such as a ball valve, or the like, may be secured to the fitting for normally closing the access to the interior of the pipe. These valves usually remain in position on the pipeline and when it is desired to retrieve or extract a fluid sample from the interior of the flow line a suitable device may be secured to the valve and inserted through the open valve into the flow stream in order to withdraw a fluid sample. Subsequent to the removal of the fluid sample, the valve may be closed and the sampling device removed therefrom. The device may be similarly used at another position along the pipeline by repeating the operation at another fitting and valve location thereon.

SUMMARY OF THE INVENTION

The present invention contemplates a novel gas sampling device adapted to be secured to the outer periphery of a pipe line, or the like, and comprises a pair of concentrically arranged tube members, one of which may be precisely inserted within the pipe line. The outer end of the tube disposed within the pipe line is open to the fluid contained within the flow line, and may be positioned at substantially any desired area of the cross sectional area of the pipe line for extracting or withdrawing fluid therefrom. In this manner, a fluid sample may be effectively retrieved from the pipe line in such a manner that reprsentative fluid samples may be withdrawn therefrom.

DESCRIPTION OF THE PREFERRED EMBODIMENT

Figure 2:
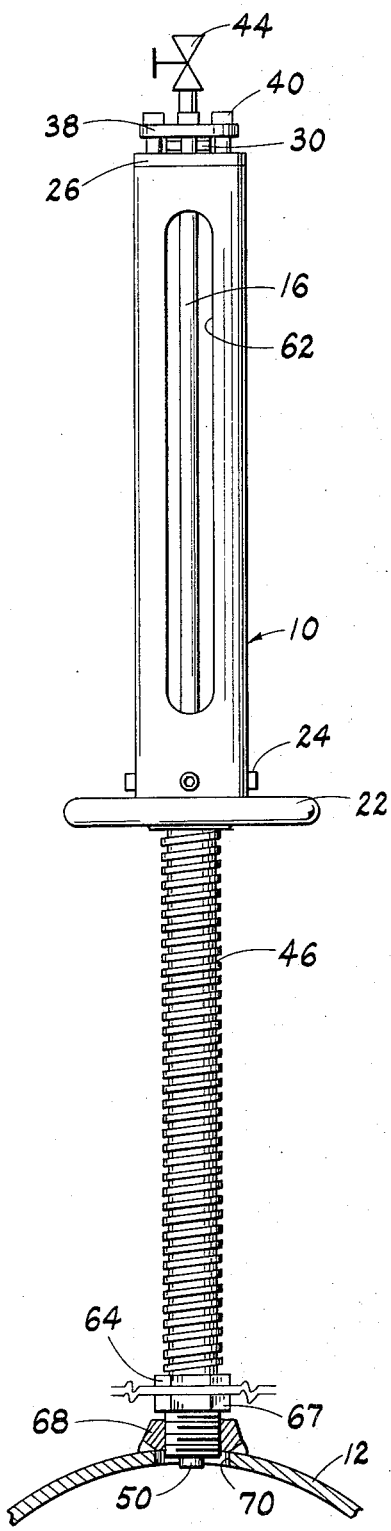
FIG. 2 is a view similar to FIG. 1, with the pipe line broken away for purposes of illustration, and showing another position for the sampler device.

Referring to the drawings in detail, reference character 10 generally indicates a gas or fluid sampling device adapted for installation on a pipe line 12, or other flow line, or the like, in a manner as will be hereinafter set forth. The gas of fluid sampling device 10 comprises an outer sleeve or housing 14 having an inner tube 16 concentrically disposed therein. One end 18 of the housing 14 is open for receiving the hub 20 of a suitable manner, such as by a plurality of circumferentially spaced set screws 14, whereby the housing 14 moves simultaneously with the wheel 22. The opposite end of the housing 14 is closed by a plate 26 having a centrally disposed aperture 28 therein for receiving the tube 16 therethrough.

An annular ring or collar 30 is welded or otherwise secured to the outer periphery of the tube 16, and a pair of annular bearing plates 32 and 34 are disposed around the outer periphery of the tube 16 on the opposite sides of the collar 30. The plates 32 and 34 may be constructed from any suitable bearing material, such as Teflon, or the like. One of the plates, such as the plate 34 is disposed adjacent the outer surface of the plate 26, and the other plate 36 is disposed adjacent the inner surface of a retainer plate 38 which is secured to the plate 26 by means of a plurality of spaced shouldered bolts 40. It will be apparent that the tube 16 is thus secured to the housing 14 for longitudinal movement simultaneously therewith, but the sleeve 14 is free to rotate about its longitudinal axis independently of the tube 16, for a purpose as will be hereinafter set forth.

The tube 16 projects beyond the plate 38, and may be threaded as shown at 42 for receiving a suitable valve 44, or other suitable fitting, as is well known in this type of apparatus. The opposite end of the tube 16 extends longitudinally through the housing 14 and through a stem or shank member 46 which is threadedly engaged with centrally disposed threaded bore 48 extending longitudinally through the wheel hub 20. The tube 16 preferably extends beyond the shank 46, and is open at the end 50 thereof for a purpose as will be hereinafter set forth. A suitable sealing ring 56, such as an O-ring or the like, is interposed between the packing gland 52 and the stem 46 for precluding leakage of fluid therebetween, and a second sealing ring 58, such as an O-ring, is interposed between the gland 52 and the outer periphery of the tube 16 for precluding leakage of fluid therebetween.

The tube 16 is provided with a central fluid passageway 60 extending longitudinally therethrough for directing a fluid sample from the interior of the pipe line or flow line 12 to the valve 44, or to a suitable storage vessel (not shown) or chamber (not shown) for testing, or the like, as is well known. In addition, the outer sleeve 14 is preferably provided with at least one longitudinally extending slot or opening 62 for permitting visual inspection of the interior of the sleeve 14 for a purpose as will be hereinafter set forth. The outer periphery of the shank 46 is preferably provided with Acme threads and a collar or stop nut 64 is welded or otherwise secured to the stem 46 spaced from the packing gland 52. The portion of the stem 46 which extends beyond the stop member 64 is suitably threaded at 66 for engagement with a suitable ball valve 67, or the like, which in turn is threadedly secured to a fitting member 68 which is welded or otherwise secured to the outer periphery of the pipe line or flow line 12. An aperture 70 is provided in the sidewall of the flow line 12 in substantial alignment with the threaded internal bore of the fitting 68 and valve 67 for receiving the tube 16 therethrough and permitting entry of the tube 16 into the interior of the flow line 12.

When it is desired to retrieve a sample of the fluid present in or moving through the flow line 12, the device 10 may be threadedly secured to a valve 67 on the pipe line 12 in the manner as hereinbefore set forth. The valve 67 may be opened in the usual manner and the hand wheel 22 and hub 20 move longitudinally along the stationary stem 46 in a direction toward the pipe 12. The outer sleeve 14 moves simultaneously with the hub 20 by virtue of the connection therebetween. The inner tube 16 moves longitudinally simultaneously with the outer sleeve 14 and through the packing gland 52 and stem 46 since the collar 30, which is rigidly secured to the tube 16, is constrained between the plates 26 and 38. However, the rotational movement of the sleeve 16 will not be transmitted to the tube 14 in the construction shown herein due to the engagement of the bearing plates 34 and 36 with the plates 26 and 38. This has been found preferable since it is considered better to provide longitudinal movement through the O-ring seal 58 rather than a combined rotational and longitudinal movement.

Figure 1:
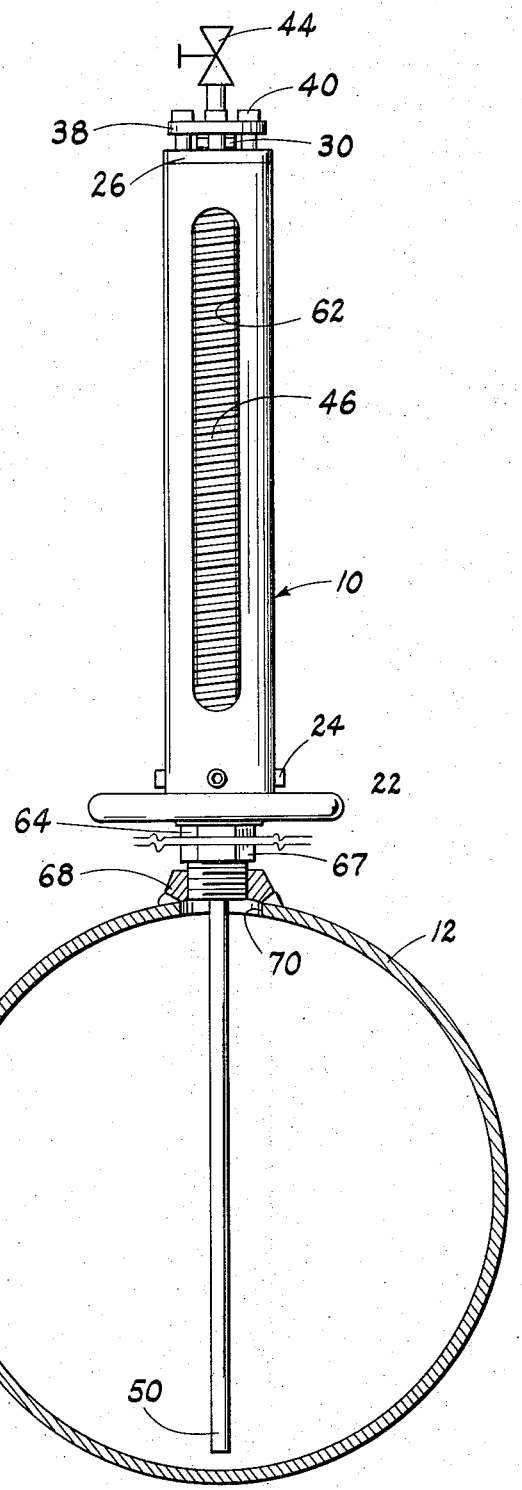
FIG. 1 is a side elevational view of a gas sampler device embodying the invention and installed on a pipe line, which is depicted in section for purposes of illustration, and shows one position for the sampler device.
Figure 3:
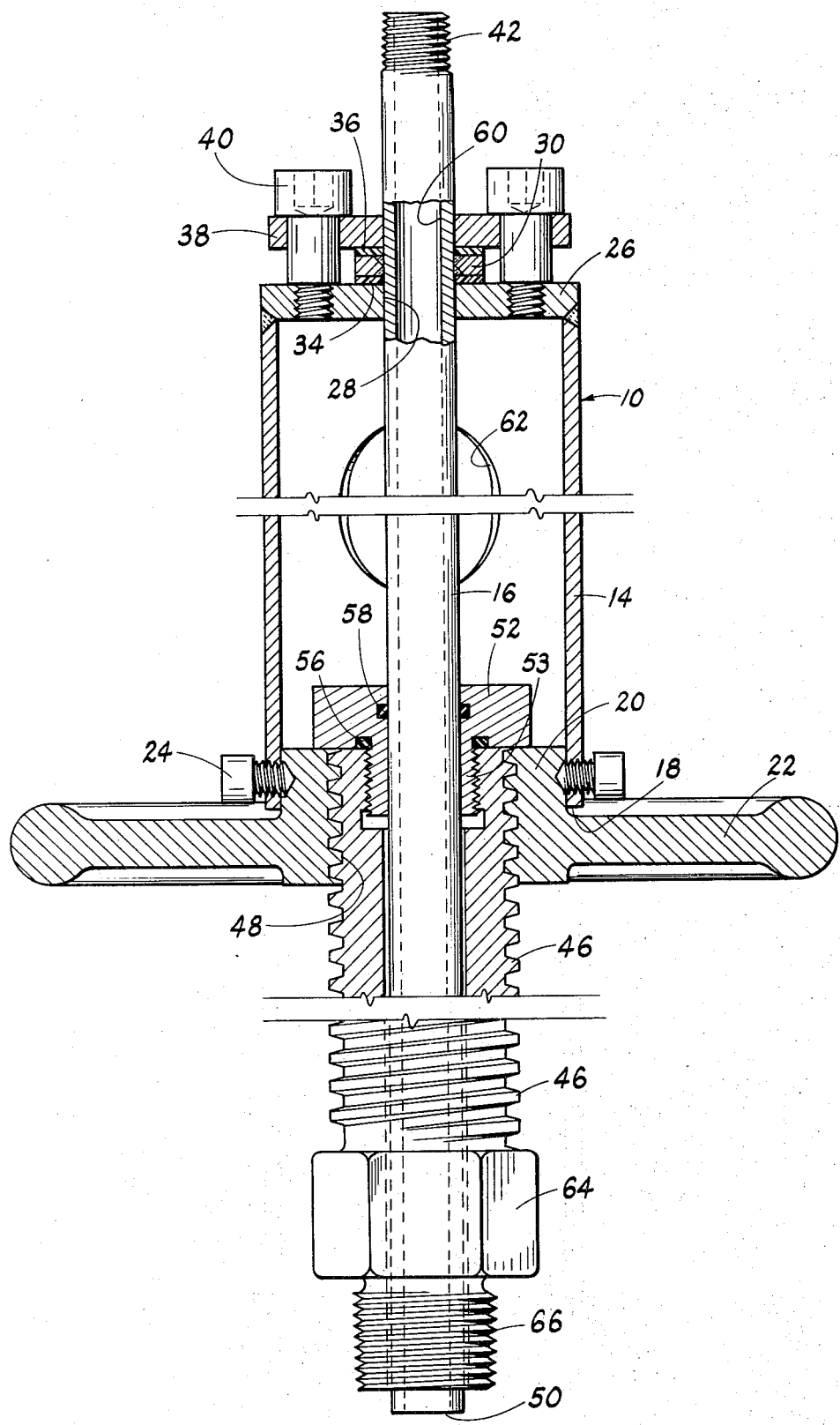
FIG. 3 is an enlarged sectional elevational view of a gas sampler device embodying the invention.

As the tube 16 moves through the stem 46 and the open outer end 50 thereof moves through the open valve 67 and the aperture 70 in the wall of the pipe 12, and transverssly into the pipe. When the wheel 22 engages the stop nut 64, further movement of the tube 16 in this direction is precluded. When it is desired to extract a fluid sample from the proximity of the bottom of the pipe 12, as shown in FIG. 1, it is the usual practise to move the wheel 22 to the limit position thereof, which positions the open end 50 of the tube 16 substantially adjacent the bottom wall of the pipe 12, and subsequently "back off" the wheel 22 for moving the open end 50 slightly away from engagement with the inner periphery of the pipe 12, as clearly shown in FIG. 1. Of course, the open end 50 of the tube 16 may be located at substantially any desired transverse position within the pipe 12 in accordance with the internal area of the pipe line wherein it is desirable to retrieve a fluid sample. The position of the open end 50 within the pipe 12 may be visually ascertained by viewing the position of the threaded stem 46 within the housing 16.

The pressure of the fluid within the pipe 12 is normally greater than the pressure exterior of the tube 16. Thus, when the valve 44 is opened, the fluid within the pipe 12 will be forced through the passageway 60 for entrapment in the storage chamber (not shown) or other vessel (not shown) for analysis, or any other reason. When the desired quantity of fluid has been captured or retrieved, the valve 44 may be closed, and the hand wheel 22 rotated in an opposite direction for withdrawing the tube 16 from the pipe 12, as shown in FIG. 2. Of course, the engagement of the hub 20 with the packing gland 52 limits the movement of the wheel 22 along the stem 46 in this reverse direction. When the tube 16 has been withdrawn completely from the pipe 12 and backed off through the valve 67, the valve 67 may be closed for precluding accidental escape of the fluid from the pipe line 12. The device 10 may then be removed from engagement with the valve 67, and relocated at the site of another fitting 68 on the pipe line 12, if desired, wherein the operation may be repeated.

From the foregoing it will be apparent that the present invention provides a novel fluid or gas sampler particularly designed and constructed for retrieving a fluid sample from substantially any area of the cross-sectional area of a flow line. An outer sleeve having a concentrically arranged inner tube is threadedly engaged with a shank member whereby the inner and outer tubes may be selectively reciprocated therealong. The outer extremity of the inner tube is open for receiving fluid samples therein, and may be selectively positioned within the flow line at substantially any desired cross-sectional area thereof for retrieving fluid samples from substantially any desired section of the flow stream present in or moving through the flow line. The novel sampling device is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A device for retrieving fluid samples from a flow line having access ports provided therein, an comprising shank means adapted for selective engagement with the access ports, tube means carried by the shank means and reciprocal with respect thereto, fluid passageway means provided in said tube means and having at least one open end for selective communication with the interior of the flow line, said open end being movable to substantially any desired transverse position within the flow line for admitting fluid samples into the fluid passageway from substantially any desired cross-sectional area of the flow line, and valve means carried by the tube means for selectively opening the fluid passageway for directing the fluid sample from the interior of the flow line to the exterior of the tube means, said shank means comprising an externally threaded stem, and said tube means being provided with complementary threaded means for engagement with the threaded stem to provide said reciprocation therebetween.

2. A device for retrieving fluid samples from a flow line having access ports provided therein, and comprising shank means adapted for selective engagement with the access ports, tube means carried by the shank means and reciprocal with respect thereto, fluid passageway means provided in said tube means and having at least one open end for selective communication with the interior of the flow line, said open end being movable to substantially any desired transverse position within the flow line for admitting fluid samples into the fluid passageway from substantially any desired cross-sectional area of the flow line, and valve means carried by the tube means for selectively opening the fluid passageway for directing the fluid sample from the interior of the flow line to the exterior of the tube means, said tube means comprising an outer sleeve reciprocally secured to the shank means, and an inner tube carried by the outer sleeve and extending longitudinally through the shank means, means interposed between the inner tube and outer sleeve for providing simultaneous longitudinal movement therebetween and independent rotation movement about the longitudinal axes thereof, said inner tube being provided with said fluid passageway means extending longitudinally therebetween.

3. A device as set forth in claim 2 wherein said valve means is carried by said inner tube.

4. A device as set forth in claim 2 wherein said outer sleeve is provided with aperture means providing a visual inspection of the relative position of the inner tube with respect to the cross-sectional area of the flow line.

5. A device for retrieving fluid samples from a flow line having at least one access port provided therein, and comprising threaded shank means adapted for removable engagement with the access port, a longitudinally extending bore provided in said shank means, a tube member extending longitudinally in and through said shank means and reciprocal with respect thereto, an outer sleeve concentrically arranged with respect to the inner tube and shank means, hand wheel means threadedly secured to the shank means and reciprocal therealong, means securing the outer sleeve to the hand wheel means for movement simultaneously therewith, means interposed between the inner tube and outer sleeve for providing simultaneous longitudinal movement therebetween and independent rotation movement therebetween about the respective longitudinal axes thereof, sealing means interposed between the shank means and the outer sleeve and inner tube for precluding leakage of fluid therebetween, and stop means provided on the shank means for limiting the reciprocal movement of the wheel means therealong.

* * * * *